(12) United States Patent
Bang

(10) Patent No.: US 7,103,804 B2
(45) Date of Patent: Sep. 5, 2006

(54) METHOD OF GENERATING AN INTERRUPT SIGNAL WHEN APPLICATION IS PERFORMED OUTSIDE OF DESIGNATED REGION

(75) Inventor: Jeong Il Bang, Gyunggi-do (KR)

(73) Assignee: LG Electronics Inc., Seoul (KR)

( * ) Notice: Subject to any disclaimer, the term of this patent is extended or adjusted under 35 U.S.C. 154(b) by 776 days.

(21) Appl. No.: 10/025,851

(22) Filed: Dec. 26, 2001

(65) Prior Publication Data

US 2002/0087951 A1 Jul. 4, 2002

(30) Foreign Application Priority Data

Dec. 28, 2000 (KR) ................. 2000-83634

(51) Int. Cl.
*G06F 11/00* (2006.01)

(52) U.S. Cl. ............... 714/38; 714/34; 717/127

(58) Field of Classification Search ............ 714/34, 714/38, 48; 717/127
See application file for complete search history.

(56) References Cited

U.S. PATENT DOCUMENTS

| | | | | |
|---|---|---|---|---|
| 5,113,521 A | * | 5/1992 | McKeen et al. | 714/15 |
| 5,193,180 A | * | 3/1993 | Hastings | 717/163 |
| 5,590,326 A | * | 12/1996 | Manabe | 711/150 |
| 5,644,709 A | * | 7/1997 | Austin | 714/53 |
| 6,634,020 B1 | * | 10/2003 | Bates et al. | 717/131 |
| 6,658,653 B1 | * | 12/2003 | Bates et al. | 717/131 |
| 6,678,838 B1 | * | 1/2004 | Magro | 714/42 |
| 6,697,971 B1 | * | 2/2004 | Dwyer | 714/54 |
| 6,728,907 B1 | * | 4/2004 | Wang et al. | 714/47 |
| 6,745,344 B1 | * | 6/2004 | Joshi et al. | 714/38 |
| 2001/0021966 A1 | * | 9/2001 | Kawasaki et al. | 711/163 |

OTHER PUBLICATIONS

"Memory protection architecture for real-time applications", Jul. 1, 1994, IBM Technical Disclosure Bulletin, Jul. 1994, vol. 37, Iss 7, p. 85-88.*

* cited by examiner

*Primary Examiner*—Scott Baderman
*Assistant Examiner*—Gabriel L. Chu
(74) *Attorney, Agent, or Firm*—Fleshner & Kim, LLP

(57) ABSTRACT

The present invention discloses a method for debugging in an application program and an apparatus thereof, in order to control a task to be performed in a designated region, based on an interrupt signal. The interrupt signal may or may not be generated depending on whether the task is performed in the designated region. The present invention can write information on a task to be performed, and check if the current task is performed in a designated region. In a case where the task is performed in another region instead of the designated region, an interrupt signal is generated, which consequently enables determination or location of an application program with an error more quickly or accurately. The interrupt signal further allows a separate diagnosis process of an error on each application program to be performed.

14 Claims, 4 Drawing Sheets

METHOD OF GENERATING AN INTERRUPT SIGNAL WHEN APPLICATION IS PERFORMED OUTSIDE OF DESIGNATED REGION

BACKGROUND OF THE INVENTION

1. Field of the Invention

The present invention relates to a method for debugging in an application program, and an apparatus thereof.

2. Background of the Related Art

One typical method for debugging in an application program is to ban users from writing into a memory. That is to say, the related art application program uses a memory management unit (MMC) to separately protect on each page. In general, the related art application program has been used for protecting a code region.

FIG. 1 diagrammatically illustrates a page descriptor used in a MMC in a related art for protecting memory. As shown in FIG. 1, when an error occurs in the application program, the MMC inside of a central processing unit (CPU) takes the responsibility of protecting the memory from the error and managing the subject memory. As shown in FIG. 1, depending on the condition whether a region is manifested as write-protected or not using a 'W' data/descriptor among other page descriptors, the MMC can designate write-protected by '1' or '0' in the 'W' data. In other words, if the MMC intends to designate a certain page region for saving as a write-protect region, the MMC can designate the W data as '1'. In contrast, if the MMC intends to save the page region, it can designate the W data as '0'.

Therefore, the related art method for protecting memory uses the MMC enabled to protect a write on each page. However, the related art method for protecting memory has various disadvantages. The write protection was not applicable to many application programs. Further, since the application programs have different stacks and are variable among one another, when an error occurred, the related art MMC was neither sufficient nor helpful to determine which application program had the error.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for debugging in an application program and an apparatus for examining whether each application program violates a region assigned to each task.

Another object of the present invention is to provide a method for debugging in an application program and an apparatus for examining whether each application program violates a region assigned to each task using comparison logic.

Another object of the present invention is to provide a method for debugging in an application program and an apparatus thereof, using an interrupt signal.

To achieve at least the above objects in a whole or in part, there is provided a method for debugging in an application program according to the present invention that includes writing information on a task to be performed; checking whether the task is performed in a designated region; and generating an interrupt signal, if the task is performed in another region instead of the designated region for the task.

One method can further include latching a data signal corresponding to the written information on the task, and outputting a task signal corresponding to the task identifier that is identified based on the latched data signal.

To further achieve the above objects in a whole or in part, there is provided a method for debugging in an application program, the method including (a) outputting a task signal corresponding to a task identifier that is identified based on a data signal corresponding to the task identifier, (b) checking an operation region of a task that is accessed based on an access of data, (c) judging whether the task is performed in a designated region based on an address signal corresponding to a result of the checking, and (d) generating an interrupt signal when the task is not performed in the designated region as a result of the judging.

To further achieve the above objects in a whole or in part, there is provided a apparatus for debugging in an application program, the apparatus including first control device for writing a task identifier provided for each task to be performed, for generating a data signal corresponding to the task identifier, and for activating a selected task, task checking device for outputting a task signal corresponding to the task identifier that is identified based on the data signal, and for generating an interrupt signal according to a determination whether a current task is performed in a designated region, and storage device for writing the task identifier provided by the first control device, and for assigning an operation region to each task.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
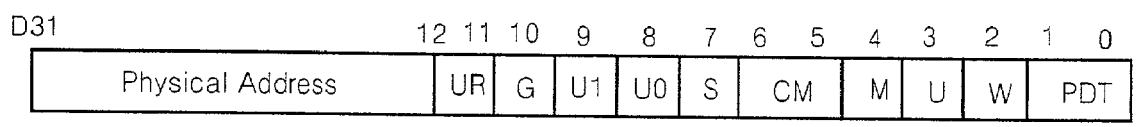
FIG. 1 is a diagram that illustrates a page descriptor used in a related art memory management unit for protecting memory.
Figure 2:
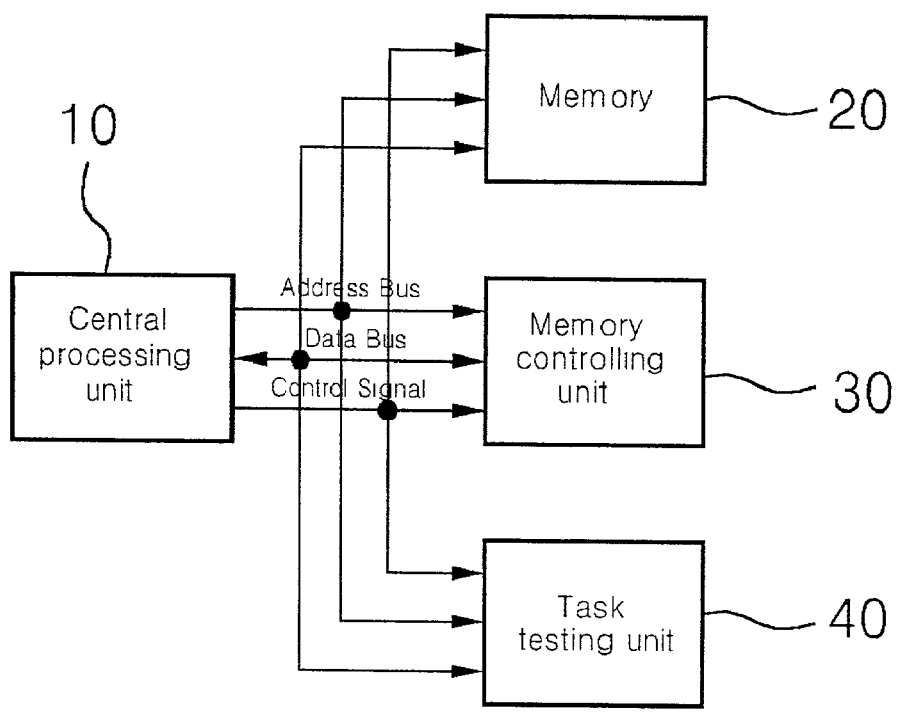
FIG. 2 is a block diagram illustrating a preferred embodiment of an apparatus for debugging in an application program in accordance with the present invention.

Preferred embodiments of the present invention, examples of which are illustrated in the accompanying drawings will now be described. FIG. 2 is a block diagram illustrating a preferred embodiment of an apparatus for debugging in an application program according to the present invention. In preferred embodiments according to the present invention, application programs have to be programmed to be performed only in corresponding pre-allocated areas. Moreover, operating systems, being activated by a central processing unit (CPU), are capable of managing the entire system and, if necessary, to operate at least one of the application programs in an operation region according to a designated procedure. As described below, one of the application programs can be designated as a task. Each task is also given a certain or prescribed region (e.g., in memory) assigned in advance for the task to be activated in the designated region only.

As shown in FIG. 2, the preferred embodiment of an apparatus for debugging includes a central processing unit 10, a task testing unit 40, a memory controlling unit 30, and a memory 20. In addition, in order to perform the task, the central processing unit 10 preferably sends a task ID enable signal out to the task testing unit 40, and generates a data signal corresponding to the task ID, simultaneously. The data signal is a binary combination that can determine or identify the task ID. For example, if the task ID is 3, the data signal can be generated as '0011' from the most significant bits of a data bus. On the other hand, the central processing unit 10 can call the task corresponding to the task ID into the operation region, and proceed to activate the task.

Figure 3:
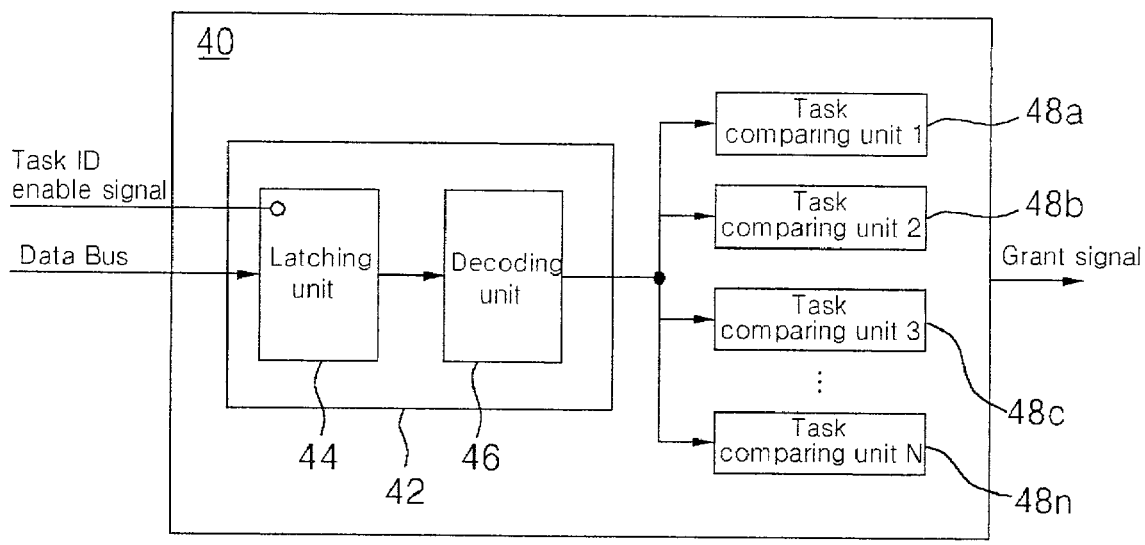
FIG. 3 is a block diagram illustrating a task testing unit in accordance with a preferred embodiment of the present invention.
Figure 4:
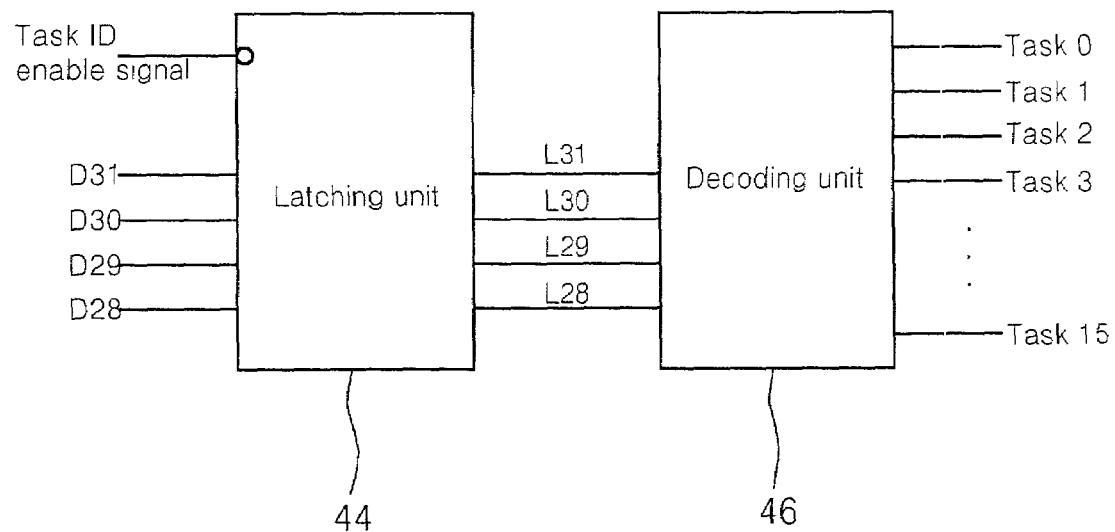
FIG. 4 is a block diagram illustrating a task identifying unit in accordance with a preferred embodiment of the present invention.

The task testing unit 40 will now be described in additional detail with reference to FIG. 3. As shown in FIG. 3, the task testing unit 40 preferably includes a task identifying unit 42 and at least one of task comparing units 1, 2, . . . N (e.g., 48a through 48n). The task comparing units 48a–48n are preferably available equal in number to the tasks. The task identifying unit 42, as illustrated in FIG. 4, preferably includes a latching unit 44 for latching the data signal on the basis of the task ID enable signal generated by the central processing unit 10, and a decoding unit 46 for outputting a task signal corresponding to the task ID that is identified based on the latched data signal. When the data signal for the next task is not yet received, the latching unit 44 preferably keeps outputting the present data signal and sends the present data signal to the decoding unit 46. The decoding unit 46 decodes the outputted data signal from the latching unit 44, and outputs a task signal. The task signal may be a signal inputted to a task comparing unit (e.g., 48a–48n) in order to perform a error testing of a task. Therefore, the decoding unit 46 can identify the corresponding task based on the task signal. Suppose that the task signal is '0011'. Then, the task signal can be inputted in to a corresponding one of the task comparing units, i.e., 48c, among other task comparing units (48a through 48n). However, the present invention is not intended to be so limited.

On the other hand, the task testing unit 40, if the task is being currently performed, can preferably check whether the subject task is being performed in a designated or prescribed region or not. That is to say, the task testing unit 40 checks or tests the operation region for the task that is currently being performed, and according to the checking result, the task testing unit 40 generates an address signal. If the task is being performed in the designated region, the task testing unit 40 preferably does not generate the address signal. In contrast, if the task is not being performed in the designated region, the task testing unit 40 preferably generates the address signal, which is later inputted in the corresponding task comparing unit 48a–48e, such as 48c. Besides the task testing unit 40, an additional separate unit (not shown) can also be provided to judge whether the task is being performed in the designated region or not in another preferred embodiment.

As shown in FIG. 3, the task signal can be inputted into one of the task comparing units (e.g., 48c), and that task comparing unit can output a grant signal according to the address signal inputted based on the task signal. Here, a write signal (WR) that is generated from the central processing unit 10 can also be used. If the write signal (WR) is a prescribed value such as >1=, the write signal (WR) is a read signal and if the write signal (WR) is set to >0=, the write signal (WR) is a write signal. However, it should be noted that the grant signal output is dependent or preferably totally dependent on the address signal. The address signal is preferably a signal for indicating whether a task is performed in the designated area or not.

Figure 5:
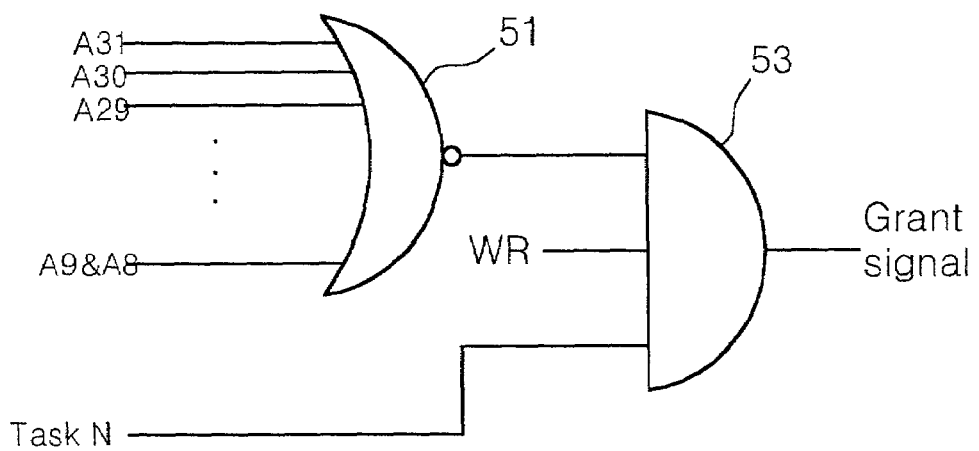
FIG. 5 is a logic circuit diagram that shows a preferred embodiment of a comparing unit in accordance with the present invention.

A preferred embodiment of a task comparing unit is illustrated in FIG. 5. As shown in FIG. 5, the task comparing unit (e.g., 48c) includes a OR-NOT gate 51 for applying the OR-NOT operation to the address signal, and an AND gate 53 that receives an output signal of the OR-NOT gate 51 and generates the grant signal based on the inputted task signal and the write signal (WR). Therefore, the task comparing unit (e.g., 48c) can generate the grant signal having prescribed values such as '0' or '1', in accordance with the consequence of the address signal and based on both the task signal and the write signal (WR). At this time, if the grant signal '0' is generated, which preferably means that the task is not performed in the designated region, an interrupt signal can be generated.

As shown in FIG. 2, when the interrupt signal is generated, the memory controlling unit 30 can send the interrupt signal to the central processing unit 10. In addition, the memory controlling unit 30 preferably outputs a control signal based on the interrupt signal in order to control the memory 20. The central processing unit 10, based on the interrupt signal, checks the ID of the task that is currently being performed, and writes the information about the task ID so that the corresponding task (e.g., currently being performed) can be debugged. The memory 20 preferably writes the task ID provided by the central processing unit 10, and assigns an operation region for each task.

As described above, the preferred embodiment of the apparatus for debugging in an application program according to the present invention provides a checking process to find out whether the current task is being performed in the designated region. However, it should be also noticed that the same preferred embodiment of the present invention can be applied to another checking process to find out whether the data, which have been calculated by the task currently being performed, are being written properly in its designated region.

Figure 6:
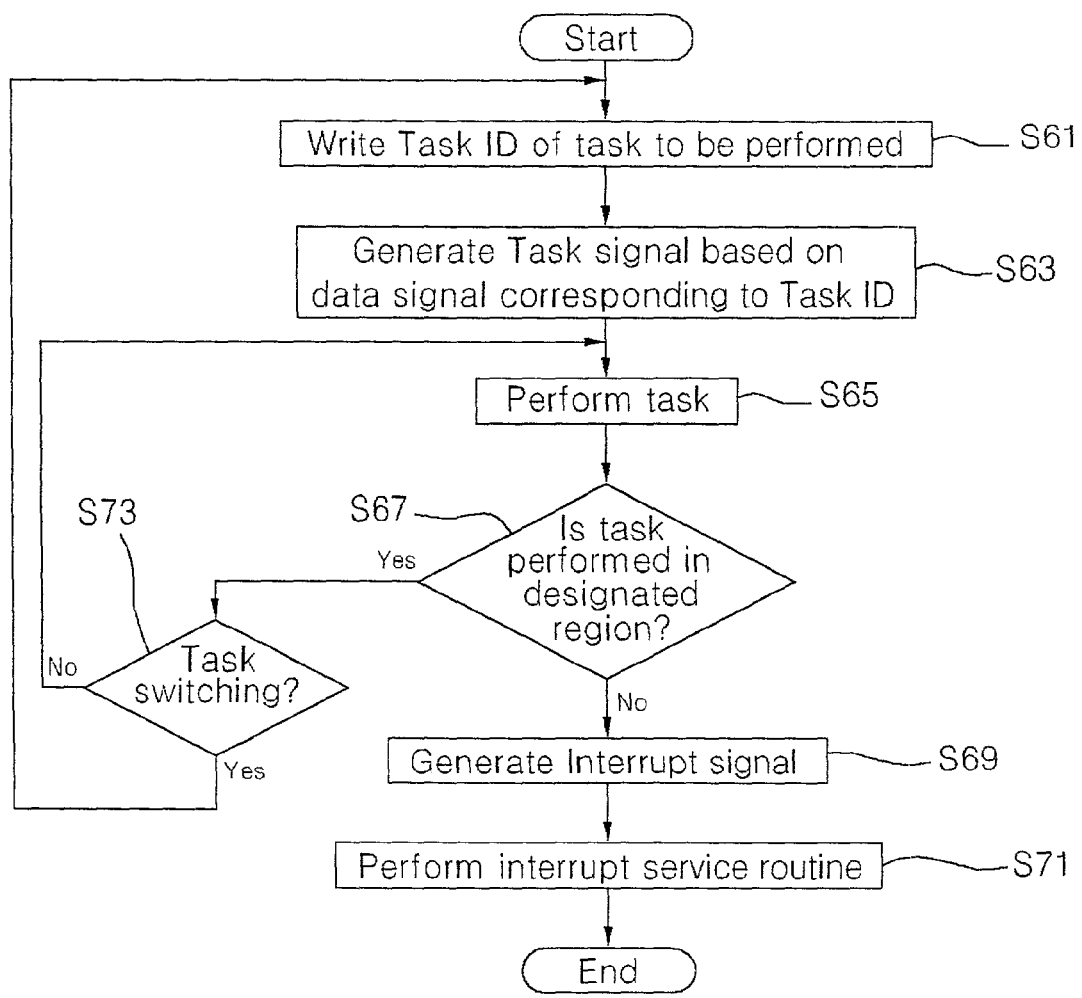
FIG. 6 is a diagram that shows a flow chart of a preferred embodiment of a method for debugging in an application program in accordance with the present invention.

A preferred embodiment of a method for debugging in an application program in accordance with the present invention will now be described. FIG. 6 is a diagram that shows a flow chart for the preferred embodiment of a method for debugging in an application program. As shown in FIG. 6, the preferred embodiment of a method for debugging can be used, for example, in the apparatus of FIG. 2. After a process starts in FIG. 6, control continues to step S61 where once a board is booted and the operating system is activated, the central processing unit 10 writes the task ID of the task that needs to be performed in the memory 20. From step S61 control continues to step S63.

In step S63, the decoder (not shown) decodes the address and control signal and sends a task ID enable signal to the latching unit 44 so that the task can be preferably immediately performed. The latching unit 44 latches the data signal corresponding to the task ID, and sends the data signal to the decoding unit 46. Then, the decoding unit 46 decodes the data signal, generating a task signal, and finally outputs the generated signal to one (or more) of the comparing units. From step S63 control continues to step S65 where the central processing unit 10 preferably concurrently calls the task corresponding to the task ID into the operation region, and performs the task. The operation region preferably means a pre-designated region by the task. If there are a number of tasks to be performed, an operation region can be designated for each task in advance.

From step S65, control continues to step S67 where during the performance of the task, it is determined whether the task is being duly performed in the designated region. In other words, as the task is performed, it is necessary to ascertain the operation region of the task. If the operation of the current task is the pre-designated region, the address signal is not generated and no error occurs for that task and control jumps to step S73.

In contrast, if it is determined in step S67 that the operation region of the task is not the pre-designated region for that current or particular task, the address signal is generated and the address signal is inputted into at least one task comparing unit. The task comparing unit (e.g., 48c) can generate the grant signal '0', based on the generated address signal. Then, upon the generation of the grant signal '0', the interrupt signal can be generated in consequence in step S69. If the generated grant signal is '1' instead of '0', no interrupt signal is preferably generated.

The memory controlling unit 30 not only preferably sends the interrupt signal to the central processing unit 10, but also outputs the control signal for controlling the memory based on the interrupt signal. From step S69 control continues to step S71. In step S71, the central processing unit 10 generates the information of the task that generated the interrupt signal by performing an interrupt service routine based on interrupt signal. Preferably, the error information of the task generated the interrupt signal is stored in the memory 20 through performance of the interrupt service routine, and a user ascertains whether any application program is generated in error using the error information of the task.

As described above, if it turns out that the operation region of the task is the pre-designated region for the task in step S67, the central processing unit 10 certifies the information of a task switching based on another interrupt signal generated in other parts of the apparatus of the present invention in step S73. If it is determined in step S73 that the task switching occurred, control jumps back to step S61. On the other hand, if the task switching is not generated, control jumps back to step S65 and the central processing unit 10 continuously executes the application program corresponding to the task. Task switching indicates a situation where the next task is performed in the middle of performing the current task.

As described above, preferred embodiments of a method and apparatus for debugging in an application program according to the present invention have various advantages. The preferred embodiments for an apparatus and method for debugging in an application program according to the present invention can reduce or solve a problem that the application program has an error occur, the error is recorded accurately. The preferred embodiments can check whether the application program is duly performed in the designated region and control the application program to be performed in the designated region based on a result of the checking. A preferred embodiment of an apparatus for debugging of the present invention including a comparison logic circuit that is low cost, small sized and more efficiently reaches accurate diagnosis.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for debugging application programs, the method comprising:
 allocating prescribed regions of a system memory for each of a plurality of application programs;
 writing application identifier information on an application program to be performed;
 checking whether the application program is performed in a designated region; and
 generating an interrupt signal when the application program is performed in a region other than the designated region for the application program, wherein the checking whether the application program is performed in a designated region further comprises,
  checking an operation region of a current application program being accessed and outputting a result,
  generating an address signal corresponding to the checking result, and
  outputting a grant signal based on the address signal.

2. The method according to claim 1, further comprising:
 latching a data signal corresponding to the written application identifier information on the application program; and
 outputting an application signal corresponding to the application identifier that is identified based on the latched data signal.

3. The method according to claim 2, wherein the designated region is the operation region assigned to each application program.

4. The method according to claim 1, further comprising:
 determining the information on the application responsive to the interrupt signal; and
 performing an operation corresponding to the information on the application based on the determination.

5. The method according to claim 4, further comprising sending a control signal that is generated based on the interrupt signal to the system memory.

6. The method according to claim 1, wherein after an application program switching occurs to a next application, a checking process based on information corresponding to the next application is repeatedly conducted to check whether the next application is performed in a corresponding designated region.

7. The method according to claim 1, wherein a task signal is used for outputting the grant signal.

8. The method of claim 7, wherein the outputting a grant signal comprises:
 logically processing the address signal, an application signal and a first write enable signal in each of a plurality of application comparison units equal in number to the plurality of application programs, and wherein said logically processing comprises, logically processing the address signal in a first logic gate, and logically processing the application signal, an output signal of the first logic gate and a first write enable signal in a second logic gate to output the grant signal used to generate the interrupt signal.

9. An apparatus for debugging application programs, the apparatus comprising:

first control means for writing an application identifier provided for a plurality of application programs to be performed, for generating a data signal corresponding to the application identifier, and for activating selected application programs;

checking means for outputting an application signal corresponding to the application identifier that is identified based on the data signal, and for generating an interrupt signal according to a determination whether a current application program is performed in a designated region;

storage means for writing the application identifier provided by the first control means, and for assigning a corresponding designated operation region for each of the plurality of applications in said storage means; and second control means for outputting a control signal to control the storage means based on the generated interrupt signal.

10. The apparatus according to claim 9, wherein an address signal is used as a basis of determining whether the current application is performed in the designated region.

11. The apparatus according to claim 9 wherein the task checking means comprises:

a latching unit that latches the data signal;

a decoding unit that identifies the application identifier based on the latched data signal, and generates the application signal corresponding to the application identifier; and a comparing device that receives the application signal and generates the interrupt signal according to the address signal.

12. The apparatus according to claim 11, wherein a plurality of task comparing units is included in the comparing device that are equal in number to application programs to be performed, wherein each comparing unit comprises, a first logic gate that logically processes the address signal; and a second logic gate that logically processes the task signal, an output signal of the first logic gate and a first write enable signal to output a grant signal used to generate the interrupt signal.

13. The apparatus of claim 12, wherein the first logic gate is an OR-NOT gate and the second logic gate is an AND gate.

14. The apparatus according to claim 9, wherein the control signal is for control of a corresponding application program.

* * * * *